Jan. 23, 1962 B. BERGHAUS ET AL 3,018,409
CONTROL OF GLOW DISCHARGE PROCESSES
Filed Dec. 7, 1956 7 Sheets-Sheet 1

Jan. 23, 1962     B. BERGHAUS ET AL     3,018,409
CONTROL OF GLOW DISCHARGE PROCESSES
Filed Dec. 7, 1956     7 Sheets-Sheet 2
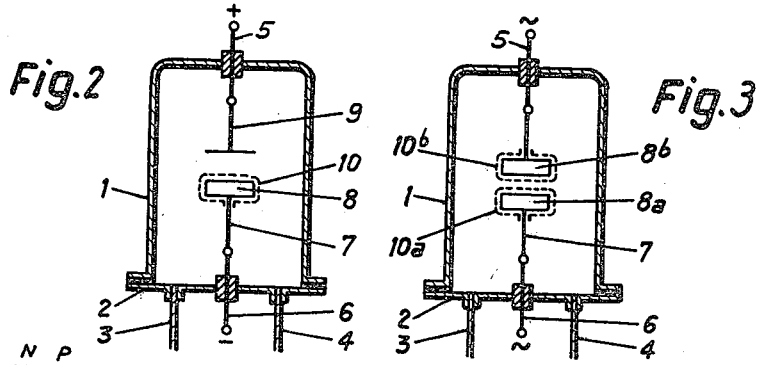
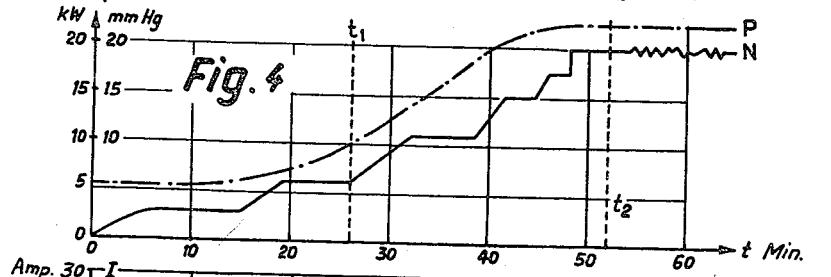
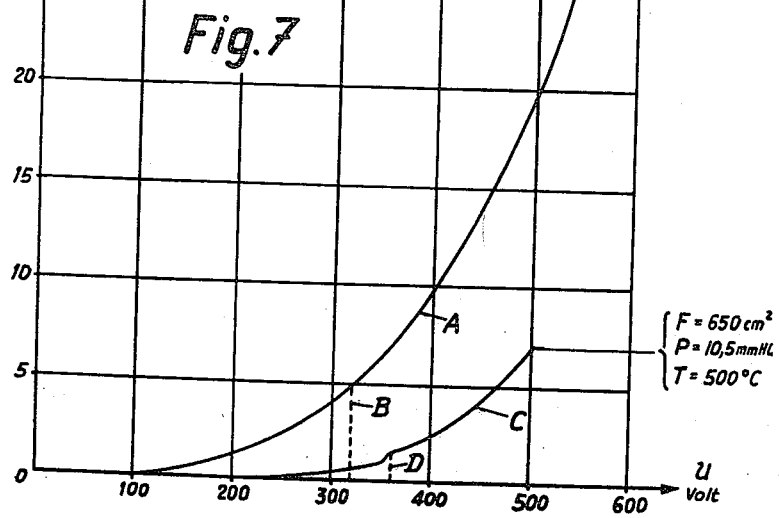
Inventors
Bernhard Berghaus
Hans Bucek
By Joseph Hirschmann
Attorney

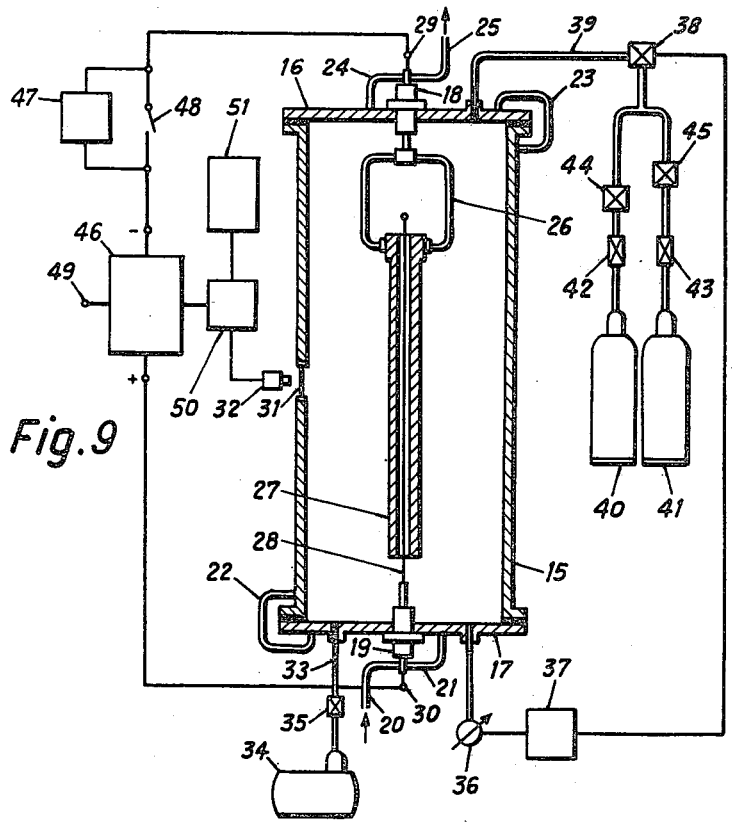

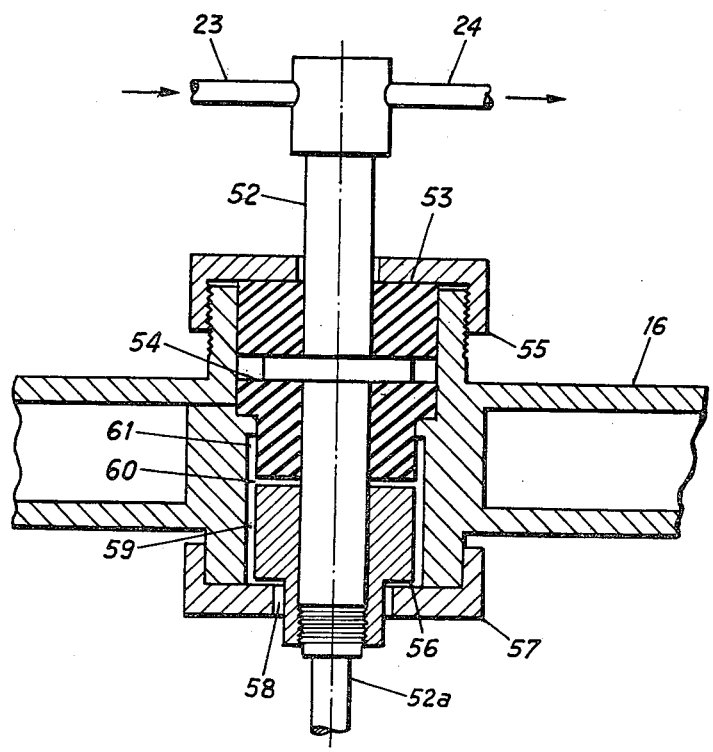

United States Patent Office 3,018,409
Patented Jan. 23, 1962

3,018,409
CONTROL OF GLOW DISCHARGE PROCESSES
Bernhard Berghaus and Hans Bucek, Zurich, Switzerland, assignors to Elektrophysikalische Anstalt Bernhard Berghaus, Vaduz, Liechtenstein
Filed Dec. 7, 1956, Ser. No. 626,934
Claims priority, application Switzerland Dec. 9, 1953
15 Claims. (Cl. 315—111)

This application is a continuation-in-part of our application Serial No. 587,624, filed May 28, 1956, now Patent No. 2,884,511, dated April 28, 1959, and also of patent application, Serial No. 579,933, filed April 23, 1956, which is a division of our patent application, Serial No. 473,895, filed December 8, 1954, both now abandoned.

It is known to use the glow discharge for technical processes, more particularly of a metallurgical nature. It is also known to use for this purpose metal discharge receptacles and to supply the required electrical energy by leading-in insulators, wherein the work-pieces to be treated may be arranged to act as electrodes. It has been found in practice that in the known processes, the supplied electrical energy is freed only partly on the work-pieces, whereby the efficiency is greatly reduced owing to great energy losses, and the economical utilisation of these processes is not favourable. Moreover, the transformation of energy of the glow discharge which does not take place on the work-pieces themselves has disadvantageous and undesirable effects on the voltage carrying constructional parts. This applies more particularly to the leading-in insulators where strong glow discharges cause to a certain extent, within a short period of time, an inadmissible reduction in the insulating property and their destruction.

The performance of processes by means of glow discharges requires, partly to obtain a time of treatment as short as possible, and partly to produce the necessary temperature on the surfaces associated in the process, transformation of energy at predetermined surfaces of up to 50 watts/cm.² It has so far been impossible to obtain such densities of energy altogether or for more than very brief durations since more or less stable discharge conditions could be obtained only with high impedances in the supply circuits, which have involved substantial technical requirements and low efficiency.

Accordingly, such glow processes have not been adopted on the industrial level and been investigated mainly on a laboratory scale. Furthermore, so far the largest possible energy turnover in such discharge vessels has been limited by the maximum admissible discharge stress of the leading-in insulators, which was comparatively low as compared with the power desirable in the performance of technical processes.

Moreover, considerable resistances have so far been required in the supply circuit of such discharge vessels to stabilize the discharge and these resistances cause corresponding losses of energy in direct-current operation thereby further reducing economy.

The present invention has for its purpose the elimination of these disadvantages and relates to a process for the obtention of an electrical glow discharge of high density of current in a discharge vessel for the purpose of performing technical processes. The process is characterized by the fact that the final discharge condition is obtained by means of a starting process while transition into an arc discharge is avoided. At the beginning of the said starting process, the voltages applied to the electrodes and gas pressure in the discharge vessel are adapted to the starting temperature obtaining and a glow discharge of lesser intensity initiated at all possible energized structural members. Gas pressure and electrode voltage are then altered to a predetermined extent until the final discharge condition is obtained with a glow discharge of high density of energy on the surfaces participating in the process. During this process, the total of the impedances present in the supply circuits is reduced to a fraction of the impedance level of the discharge spaces themselves.

A number of embodiments are illustrated in the enclosed drawings in which:

FIGS. 2 and 3 are diagrammatic views of a discharge vessel in illustration of the process;

FIG. 4 is a diagram showing the starting process;

FIG. 7 is a current/voltage characteristic of a glow discharge in the final discharge condition;

FIG. 8 is a diagrammatic view of a further discharge vessel;

FIG. 9 is a layout diagram with a discharge vessel for the treatment of steel tubes;

FIG. 10 is a longitudinal section of a current lead-in for the discharge vessel according to FIG. 9;

The process according to the invention is based on the knowledge consolidated by many years of experimentation, namely, that the high transformation of energy required for the carrying out of metallurgical and chemical processes by means of glow discharges on an industrial scale can be attained in a discharge vessel in the case of continuous operation only when a very substantial condition of discharge can be reached and maintained. This is clear in view of the fact that a transformation of energy on the surfaces participating in the process, of the order of 30–50 watts per cm.² and 20,000 watts per treated work-piece, is required and is to be obtained in continuous operation for several days, and maintained without difficulties. The technical processes to be carried out by means of glow discharges that mainly come into question are: the diffusion of substances into metal surfaces, for instance incorporation of nitrogen, boron, silicon, tungsten etc., as well as processes of a chemical character, such as reductions, hydrations, polymerisations etc. and all kinds of smelting processes.

Obviously, such a treatment can be carried out only when it is possible, on the one hand, to maintain stable operation in the case of great energy density, very high temperatures, and local disturbances at the surfaces involved in the process, and, on the other hand, to concentrate the powerful glow discharge upon the surface to be treated or otherwise taking part in the technical process, and upon the layer of gas directly adjacent thereto, whether these surfaces are metal work-pieces, or only supports for the substances to be treated. This concentration of the energy transformation upon definite surfaces or gas layers is, on the one hand, required for reasons of economy, since only on the surfaces that participate in the process does an energy transformation which is useful and contributes to the carrying out of the process occur, whilst the energy transformation that takes place at other points in the discharge receptacle, such as the leading-in insulators, the work-piece supports, the surfaces of the work-piece walls etc. which have not to be treated, represent a loss in output. Also a shunt discharge, for instance by a current path from one electrode to the conducting wall and therefrom back to the other electrode causes a reduction in the efficiency and has to be avoided. But also for reasons of safe operation, it is absolutely necessary to concentrate the energy transformation on the surfaces at least in part participating in the process since, as above mentioned, the other voltage carrying constructional parts, and more particularly the leading-in insulators, ought not to receive during continuous operation the impact of more than a definite relatively low discharge.

Figure 1:
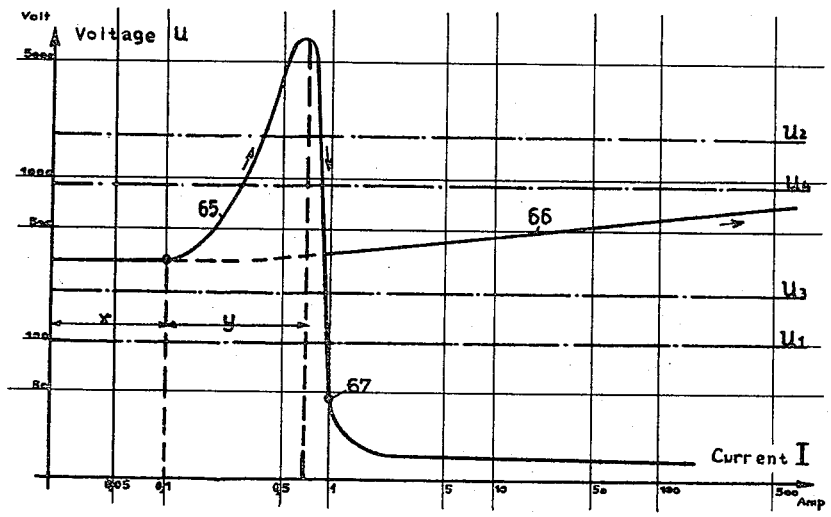
FIG. 1 shows a typical current/voltage characteristic of usual glow discharges in comparison with a characteristic obtainable with the process according to this invention.

As is well known, the current/voltage characteristic 65 of, for instance, an electrical gas discharge as hitherto known according to FIGURE 1, operated by a direct current voltage, shows a so-called "normal" region X and a following abnormal region Y of higher voltages, whereby the abnormal region Y is followed, with a further voltage and current increase, by a falling characteristic leading to the point 67, where the glow discharge passes into an arc discharge.

The current/voltage diagram shown in FIGURE 1 and its characteristic 65 show the typical course of glow discharges in the case of direct current voltage according to the present state of the art and science (see, for instance, Dosse, Nierdel "The electric current in high vacuum and in gases," Hirzel, 1945, p. 317, and Loeb, "Fundamental Process of Electrical Discharges in Gases," published by Wiley, 1947 pp.606 and 608).

The normal region X of the discharge terminates at that current at which the voltage carrying parts of the electrodes are completely covered by the glow discharge. With further voltage increase, the voltage and the discharge current increase, whereby the increasing voltage which, as is well known, has a substantial effect concentration on the so-called cathode drop, immediately before the negative electrode, so that the positive gas ions impinge upon the electrode surface with increased kinetic energy. In operation with direct current voltage, this effect takes place continuously at the cathode, whilst in operation with alternating current each electrode becomes a cathode during each half period. In the space of the cathode drop, when the glow discharge is not disturbed, equilibrium takes place between the current of ions to the electrode surface and the electrons which are there released. The increase in energy of the impacting ions which takes place with increase in voltage heats up the corresponding electrode, which leads to a thermal emission of electrons from the metal of the electrode. This thermal emission current of negative electrons, and other but little explained emission processes taking place at the electrode in mutual reaction with the surrounding layer of gas, may lead to a contraction of the discharge to a "burning spot" and to ignition of an arc between the electrode and the adjacent counter-electrode. This transition into the arc discharge corresponds to the point 67 of the characteristic 65, which apparently lies at that point where the glow discharge cathode drop is caused—at least partially—to disappear to a large extent by the emission of electrons from the metal of the electrode. The total discharge voltage of the arc discharge is always less than half the glow discharge voltage in the case of operation in the normal region X of the characteristic. It is to be pointed out that the physical conditions in the case of powerful glow discharges are not yet completely elucidated. For instance, it is possible that another emission takes place before the thermal one, for instance a secondary emission of electrons, a field emission, and so on. Discharges without a well defined burning spot, have also been made known by publications, for which, however, as compared with the glow discharge voltage, much lower working voltages are just as characteristic as for the arc discharge contracted in a burning spot. The above explained transition from a glow to an arc discharge represents a possible explanation according to the present state of the art, but, as regards the process according to the invention, which has been developed by experiment investigations, serves only as a working hypothesis.

As regards industrial processes by means of glow discharges, transition into an arc discharge must be avoided in all circumstances, since the same always causes local overheating at individual points of the electrode surfaces and does not allow of any uniform and repeatable process of the known kind to be carried out. The increase in the density of the energy of the glow discharges was hitherto limited by the heating of the electrodes thereby arising and by their thermal emission of electrons, which necessarily led to a transition into an arc discharge with more or less concentrated contraction of the discharge on limited electrode regions, with a simultaneous drop of the discharge voltage to values much below 100 volts. Thus, it was not possible in the past, in the case of an increase in the energy transformation of a glow discharge, to avoid the unstable transition region of the discharge characteristic from the glow to the arc discharge.

According to the process here disclosed the elimination of these difficulties requires a starting process at the completion of which the end state of the stationary discharge is attained which takes place with predetermined energy transformation and predetermined specific output on the surfaces participating in the process and which can be maintained in continuous operation, whereby the energy transformation and the specific output at all other parts does not exceed predetermined maximum values. The process is by no means limited to a definite arrangement of electrodes and shapes of the surfaces participating in the process and can be used practically in all cases that may occur, as long as the arrangement is carried out as required. It is to be understood that the example diagrammatically illustrated in FIGURES 2, 3 and 4 are only put forward to explain the process in connection with suitable arrangements and discharge vessels. As is hereinafter described, the carrying out of the process according to the invention requires that it be planned according to the desired results, and the articles or substances to be treated.

The discharge receptacle shown in FIGURE 2 for carrying out such a process is adapted, for instance, to operate on a voltage of constant polarity, but not necessarily of constant amplitude. The same comprises the removable upper part 1 and the bottom part 2, both preferably consisting of an electrically conducting material, for instance metal. The parts 1 and 2 are connected together in a gas-tight manner, and a gas atmosphere of any pressure and any composition may be produced inside through the gas suction pipe 3 and gas supply pipe 4. The upper part is provided with an insulated lead-in 5, which in this case represents the anode connection, and a corresponding insulated lead-in 6 is provided in the bottom part, the same acting as a cathode connection, both lead-ins are built in a gastight manner in the corresponding walls 1 and 2. The lead-in connection 6 supports, through suitably formed holders 7, the articles to be treated in the industrial process; in this case, for instance, the metal workpiece 8. Opposite the latter there is provided an electrode 9, which is secured to the lead-in connection 5 and represents the anode, but which is itself not participating in the technical process to be carried out. The problem now is, to limit the powerful flow discharge, indicated in dotted lines by 10 in FIGURE 2, as much as possible to the outer surfaces of the workpiece 8 participating in the process, and to attain there a predetermined value of the energy transformation for a predetermined specific output, without the other voltage carrying part 5, viz. the inside of the lead-in connections 5 and 6, the holders 7 and the electrode 9 showing any glow discharge impact exceeding the admissible maximum. Also the inner walls of the receptacle parts 1 and 2 should be as free as possible from such disturbing glow discharges and energy losses resulting therefrom.

The same problem arises also in connection with alternating current operation of such a discharge receptacle 1, 2, but, as shown in FIGURE 3, in this case there is no longer any difference between the anode and the cathode, for which reason now two work-pieces 8a, 8b can be subjected simultaneously to the desired process, which workpieces are secured to the one and the other holders 7 and 9 respectively and are connected with the lead-in connections 6 and 5 respectively. The powerful glow discharge 10a and 10b should be limited as much as possible to the two outer surfaces of the work-pieces 8a and 8b participating in the process.

These problems—quite unsolvable in the hitherto known glow discharge industry, as regards the outputs required for industrial application—is soluble only then when special means are provided which co-operate with the surfaces participating in the process and the desired end state of the gas discharge is produced by a starting process. However, in the very different industrial processes used in actual practice and the different forms of work-pieces, possible reactions of the surfaces that are participating in the process, a careful preliminary planning of the required process is necessary.

In the starting process according to this invention, the gas pressure and the electrode voltage are so adjusted at the beginning as to be adapted to the electrode arrangement provided according to the above mentioned rules, and to their initial temperature, and effect the glow discharge which, as usual, is of any desired extent. The electrode voltage and the gas pressure are advantageously so chosen that in the starting phase of the starting process all voltage carrying parts are covered by a layer of glow. The insulating lead-in connections 5 and 6, especially sensitive to detrimental effects of such still low power glow discharges, are provided with means, hereinafter described, capable of rendering them immune. The time period of this starting phase of the starting process is extended so long until all the defects of the surface layer such as surface impurities causing irregularities in the discharge by the same being contacted during their incorporation, or gaseous eruptions, and the like, are removed by the action of the layer of glow. Owing to the increase in temperature during this starting phase changes in the electrode voltage and gas pressure may become necessary, in order to be able to maintain the complete glow covering of all the voltage carrying parts.

After removal of all these imperfections in the surface layer, the glow covers uniformly the voltage carrying surfaces. Now, by continuously increasing the gas pressure and, generally, also the electrode voltage, the specific output of the discharge at the surfaces participating in the process is increased, and therewith the energy transformation is increased in steps. In this way, it is attained that a specific output of the glow discharge at the surfaces not participating in the actual process is not increased to the same extent, and in certain circumstances is even more and more reduced, so that the energy transformation is mainly limited to the desired surfaces, which, therefore, are heated up gradually, approaching the temperature required for the metallurgical or chemical process to be carried out. This end state of the discharge is reached after a starting period of time, which is characteristic for each process and the kind and size of the participating surfaces, or layers of gas, whereby the powerful glow discharge is greatly concentrated upon the surfaces participating in the process, showing there a predetermined value of specific output and of energy transformation, whilst at all the other voltage carrying parts, especially at the lead-in connections, the discharge impact does not exceed a given maximum. If desired, the glow discharge during the starting process may be stabilised by the insertion of a series impedance, for instance an inductive impedance, in the supply circuit of the electrodes. Instead thereof, or additionally thereto, a practically inertia-free control of the electrode voltage may be provided, which, upon a predetermined adjustable maximum current being exceeded, or upon dropping under an adjustable minimum voltage, effects a voltage drop of short duration to a predetermined value, or switches off the voltage altogether. The purpose of both these measures is to avoid an inadmissible strong local heating of individual surfaces when great irregularities suddenly arise in the surface layer, as for instance in the case of gas eruptions.

The starting process must always begin with a smaller energy transformation and lower specific output than is provided for the end state aimed at, namely, if the output capacity of the discharge receptacle, measured at the lead-in connections, shall not amount to more than about 50% of that of the end state or lie even much lower. It is generally advisable to begin the starting process with a reduced electrode voltage as well as with a reduced gas pressure, but this is not absolutely necessary. In some instances, and in the case of special arrangements of electrodes or processes, also the gas pressure may be the same at the beginning as at the later end state, and only the electrode voltage be reduced, or the electrode voltage corresponding to the end state be applied already in the starting phase and the gas pressure be correspondingly reduced. In the case of a typical process the gas pressure $p$ and the output $M$ are dependent upon the time $t$ as in the diagram shown in FIGURE 4.

Figure 5:
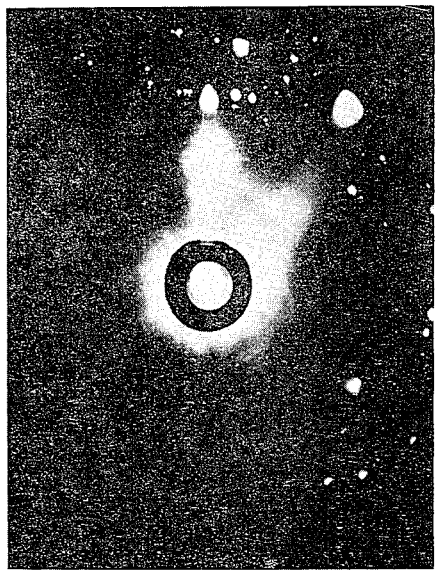
FIGS. 5 and 6 are photographs of the interior of the discharge vessel according to FIG. 9 at the beginning and at the end of the starting process.
Figure 6:
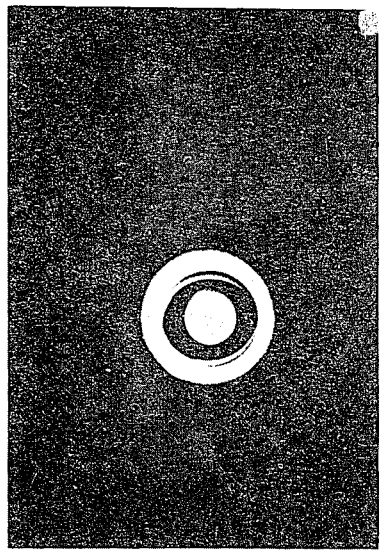

An example of the phenomena during the starting process in a cylindrical metal receptacle 15, shown in FIGURE 9, of about 350 mm. internal diameter is illustrated in FIGURES 5 and 6, namely, for the surface treatment of a steel tube 27 of about 20 mms. internal diameter, 70 mms. outer diameter and 2,400 mms. long, which tube is suspended in an insulated manner in the receptacle. A tensioned metal wire 28 is suspended in the interior of the tube 27. At the upper end an inclined mirror is mounted perpendicularly above the tube 27, by means of which the tube 27 and the inner wall of the receptacle 15 can be observed during the operation by means of an observation window at the upper end of the receptacle 15. The object in this case is to concentrate the powerful discharge as much as possible upon the inner and outer surface of the tube 27.

At the beginning of the starting process, the interior of the receptacle 15 appears as is shown in FIGURE 5. As can be seen, individual parts of the outer surface of the tube show irregular glow discharges, some of them of strong emission, resulting in discharge paths between the tube 27 and the inner wall of the receptacle. Without the above mentioned measures in the supply circuit places of strong emission would suddenly cause arc discharges between the tube 27 and the wall of the receptacle. The parts of strong emission of the wall of the tube 27 are due to impurities, to oxide layers, or to other defects of the surface and are propagated irregularly over the whole outer surface thereof.

The end of the starting state is shown in FIGURE 6. Now, the glow discharge is largely concentrated on the tube 27, and the inner wall of the receptacle show only traces of the glow (anode glow). The glow discharge has now reached its end state with the predetermined energy density, whereby, in this case, the steel tube shows a temperature of 510° and is operated over the whole surface with an energy density of about 1.5 watts/cm.$^2$. The series impedance lying in the supply circuit during the starting process is disconnected. The sum of all impedances in the supply circuit should amount, after the end state of the discharge has been reached, to not more than at most 30%, preferably less than 10% of the impedance of all the discharge paths, measured at the connections 29 and 30 (FIGURE 9).

In practice, it has been found advantageous for the starting process to be carried out in two sections, the discharge receptacle, for instance the receptacle 15 in FIGURE 8, thereby operating differently. One of these two consecutive sections has already been fully described above. In the other section at least a partial concentration of the glow discharge is effected upon the surfaces of the lead-in connections 18 and 19 to which a voltage was applied. Since the work-pieces to be treated and their holders are always connected to the lead-in connections, the control of the enlargement and energy transformation of the glow discharge, for the purpose of carrying out the two sections of the starting process, is possible only by suitably adjusting the pressure in the discharge vessel and the voltage applied to the lead-in connections 18 and 19. These different factors of operation are adjusted one after the other, but it is not always possible and necessary to effect a sharp separation of the treatments in the two sections. Likewise, the treatment of the surfaces to which the voltage is applied at the lead-in connections may be carried out first and then the above described treatment of all the other parts to which a voltage has been applied, and, if necessary, also the inner walls of the container, or vice versa.

For this reason, in order to obtain a glow discharge on the surfaces of the lead-in connectors 18, 19, to which a voltage has been applied, substantially other working factors of the discharge vessel come into question, since, generally, special means are provided on such lead-in connectors, in order that under normal working conditions of the end state of the discharge, these surfaces, to which a voltage has been applied, have to be kept as free as possible of glow discharges. Such means consist, for instance, of a narrow gap system surrounding the lead-in connector concentrically, before the insulator. If a definite working pressure is provided, the width of the gap can be made substantially small, so that only a so-called "hindered" glow discharge can be produced within the gap, the energy density of which is substantially lower than that of a normal glow discharge. Thus, in order to produce a stronger glow discharge in such a gap system, the walls of which are always surfaces to which a high voltage is applied, the pressure in the discharge vessel has to be increased, normally beyond the pressure provided for the end state of the discharge. The pressure required for this section of the starting process is determined to a great extent by the geometrical form and the dimensions of the gap system. If the work-pieces and the receptacle are at normal room temperature, it is possible, by adjustment to a substantially higher pressure in the discharge vessel, actually to produce a large concentration of the glow discharge on the lead-in connectors 18, 19, and their gap system.

The working voltage is thereby so adjusted that it is sufficient to obtain an increase in temperature on the gap forming surfaces to which a voltage is applied.

An example of construction of such an insulated leading-in connection is shown in axial section in FIGURE 10, the same being incorporated in the double-walled upper cover 16. The middle conductor 52 with the fixing bolts 52a projecting into the interior of the receptacle and supporting the holder of the work-piece 26 (FIGURE 9) is so arranged as to allow for water cooling, the latter entering the pipe 23 and flowing out through the pipe 24. The middle conductor 52 is insulated from the cover 16 by means of the insulating members 53 and 54, which are pressed by means of the screw cap 55 against the corresponding abutting surfaces of the cover 16, ensuring, on the one hand, a gas-tight closure and, on the other hand, enabling the whole of the leading-in connection to be easily dismounted. The middle conductor 52 is surrounded by a metal sleeve 56 at the end directed towards the interior of the receptacle, which sleeve is partly screened by a metal cap 57 secured to the inner wall of the cover 16. The gap system shown in FIGURE 10 prevents a powerful glow discharge and thereby increases the maximum admissible impact of the discharge on the leading-in connection. The gap system consists of the annular gap 58 between the (earthed) cap 57 and the sleeve 56 to which a voltage is applied, the main gap 59 between the (earthed) wall 16 and the sleeve 56, the transverse gap 60 between the sleeve 56 and the insulator 54, and the annular gap 61 between the insulating member 54 and the (earthed) wall 16. By preventing a powerful glow discharge by suitably dimensioning the gap system and the water cooling, such a leading-in connection can be used with perfect safety as regards the discharge impacts, which can hardly be avoided in technical processes.

Owing to the action of the glow discharge with its ion bombardment and to the heating up, at least superficially, of the surfaces to which a voltage is applied, all the defects thereof are during the starting process, which defects, owing to gas eruptions, evaporation, electron emission or the like, cause irregularities in the discharge. This section of the starting process is, in any case, continued so long until this is attained, which, as found by experience, always succeeds.

When the starting process is completed, and the process correctly planned according to the above mentioned rules, the arrangement of the electrodes, more particularly with respect to temperature and the constitution of the surfaces participating in the process, is in a condition of continuous stable operation. If desired, the discharge receptacle may now be put out of operation, even for shorter periods of time, for instance a few minutes, and immediately thereupon be put again into operation with the full power. The choice of the current density on the surfaces participating in the process is of special importance for the stability of the end state of the discharge. Only when the current density of the glow discharge is properly chosen is it possible to avoid the transition thereof into an arc discharge or into the unstable part of the characteristic 65 in FIGURE 1. The rules for the selection of the suitable current density depending on the type of the process to be performed are disclosed in our copending application Serial No. 579,934, filed on April 23, 1956, as a division of our U.S. patent application Serial No. 473,895, filed on December 8, 1954, both now abandoned. It is there explained that under certain conditions, after the starting process has been performed and completed, any desired increase in the energy transformation of the glow discharge up to any desired temperature of the electrode surfaces participating in the process is obtained whilst ensuring a continuous and continuously increasing characteristic, as is indicated for instance by 66 in FIGURE 1. This is rendered possible by the fact that the electron emission of all metals and their compounds has for any temperature a definite value which cannot be exceeded. The emission per unit of surface is known exactly for most chemically pure substances in dependence upon the temperature. If in the case of a predetermined desired temperature of the surfaces participating in the process one can produce and maintain in their immediate proximity a state of gas discharge at which the current of positive ions flowing towards the cathode is higher than that required for the balance of the discharge, preferably even a multiple of the electronic current emitted by the corresponding surfaces, then the disturbance of the discharge balance in the cathode drop space by the electron current that is emitted cannot exert a dominating influence, that is to say, it cannot tend to effect transition to an arc discharge.

However, one must in this case be sure that the ionic current has the required value at all the points of the surface participating in the process, so that also in the case of sudden occurrence of strongly emitting points, of gas outbursts, and local overheating resulting therefrom, up to white heat, it will at these points be higher than the emission current. Only when this is the case, it is impossible for such disturbing places on the electrode surfaces to have a marked influence on the cathode drop space.

It is particularly pointed out that the starting process above described may be similarly performed for all other glow discharge processes in which other conditions obtain in the final discharge condition thereby accordingly establishing the prerequisite for the obtention of a stable final discharge condition.

The starting may be performed with any glow discharge equipment, preferably with equipment having conducting walls in accordance with those shown in FIGS. 2 and 3. On the other hand FIGURE 8 shows a receptacle construction in which the two attachable ends 12 and 13 are of electrically conducting material, but separated from each other by a cylindrical intermediate member 14 of insulating material. The lead-ins 5 and 6 are provided in the ends 12 and 13 respectively. The shape of the receptacle can, of course, be adapted to a large extent to the shape of the article to be treated. It appears easy to avoid difficulties that may arise by using walls of insulating material in the proximity of the leading-in connections. However, this is not possible in practice since insulating inner walls become very quickly electrically conductive during working (spraying etc.).

One example of construcion of a discharge receptacle and controlling means for carrying out the starting process of a tempering process of the inner wall of a steel pipe is shown diagrammatically in FIGURE 9. The discharge receptacle consists of an elongated cylindrical chamber 15 closed in a gastight manner by means of upper and lower covers 16 and 17 respectively. The walls of the chamber 15 and the two covers 16, 17 are double-walled in order to allow for a flow of cooling water. Leading-in connections 18 and 19 project into the inner space through the two covers 16, 17 respectively. Also these leading-in connections 18, 19 are water cooled, and the cooling water for the whole of the discharge receptacle is supplied from the pipe 20, through the leading-in connection 19, the pipe 21 to the double-walled cover 17, through the latter and the pipe 22 from below, into the cooling jacket of the chamber 15, and leaves the same at the top through the pipe 23, flows through the double-walled cover 16 and through the pipe 24 to the leading-in connection 18 and therefrom to the discharge pipe 25. In the interior of the discharge receptacle there is, for instance, suspended at the upper leading-in connection 18, through the stirrup 26, a steel pipe 27, the walls of which are the surface participating in the process. Since the bore of the pipe 27 to be treated has to have a length greater than 80 times its diameter, there is provided a thin rod 28 acting as a counter-electrode, the same being secured to the lower leading-in connection 19 and projecting freely out of the bore along the axis, of the pipe, or it may be supported at its upper end by means of a further leading-in connection, on the receptacle wall. In this way, the pipe 27 is connected as one electrode to the connection 29 and the rod 28 is connected to the connection 30 as the other electrode. The temperature measurements of the work-piece 27 is effected through an inspection window 31 by means of a radiation pyrometer 32.

The interior of the discharge receptacle may be evacuated to the required extent through the gas suction pipe 33 and the valve 35, by means of a suitable pump arrangement 34. A pressure gauge 36 is provided to indicate the gas pressure, and it so controls the gas inlet valve 38 through the device 37 that the predetermined gas pressure is maintained in the interior of the chamber 15. The composition of the gaseous atmosphere in the interior of the discharge receptacle may be controlled by the supply of gas through the pipe 39, which is fed, through the valve 38 controlling the admitted amount, for instance from two gas cylinders 40 and 41, through the pressure reducing valves 42 and 43 and the stop valves 44 and 45 respectively. The shown installation comprising two gas cylinders 40 and 41 is adapted for instance, for the use of an inert gas, for example krypton, and the admixture of another gas, for instance, nitrogen for the gaseous atmosphere in the discharge receptacle. The electrode terminals 29 and 30 are connected to the negative and positive poles of a source of direct current 46 respectively, and a series impedance 47 is inserted in the terminal to the connection 29, which impedance can be short-circuited by a switch 48. The source of direct current 46 in this case, for instance, a rectifier which is supplied at the terminal 49 with a single phase alternating current, and can be controlled by a regulating device 50 as regards the voltage that is applied. The regulating device 50 is actuated, on the one hand, by a commando device 51 and, on the other hand, by the measured voltage which is proportional to the temperature indicated by the pyrometer 32. The source of direct current 46 may be such that the positive as well as the negative poles are not connected to earth, and that the discharge receptacle itself is earthed or the positive connection 30 together with the discharge vessel may be earthed.

During the starting process the discharge receptacle is preferably hand-controlled. Thereby, the switch 48 is open so that the impedance 47 lies in the electrode circuit to limit the current of the glow discharge. The control device 37 for obtaining the desired gas pressure may also be hand-controlled. When the starting process is completed, the series impedance 47 is short-circuited and the electrode voltage is automatically maintained at such a value that it will ensure the predetermined temperature of the surfaces participating in the process, whereby the temperature measuring device 32 correspondingly controls the regulating device 50.

Figure 11:
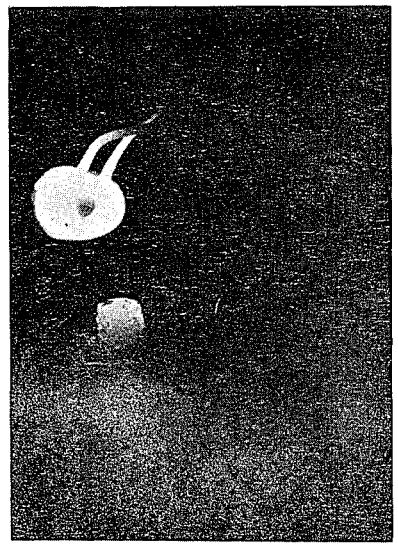
FIG. 11 is a photograph of the interior of a discharge vessel with a molybdenum tube operating as a cathode in illustration of the final discharge condition of a starting process performed according to the process here disclosed.

The fact that the described starting process enables glow processes to be carried out under very extreme conditions is hereinafter explained in connection with a glow process with reference to FIGURE 11 which is a photograph of what was seen through an observation window in the wall of a metal receptacle during the operation. In this case one electrode consists of a molybdenum pipe having a diameter of about 8 mms. and a length of 50 mms. viz. a surface of about 14 cm.$^2$, and the other electrode is a metal bolt, about 14 mms, away therefrom. The 50 cycle alternating current voltage at the electrodes is about 700 volts and the receptacle contains hydrogen, at a pressure of 9 mm. Hg. The molybdenum pipe shows, in the discharge state, a temperature of about 2000° C. also in the case of an energy density corresponding to a radiation of about 50 watts/cm.$^2$ on the outer surface of 7 cm.$^2$, thus a total output of about 350 watts.

The starting process according to the invention is required for the treatment of large surfaces of individual work-pieces, as well as for simultaneous treatment of small surfaces on a number of work-pieces and, by the proper arrangement of the individual work-pieces, if desired, by using auxiliary electrodes, it is possible to limit the powerful glow discharge to the surfaces of the individual work-pieces participating in the process. When the discharge receptacle has applied to it a voltage of constant polarity, all the work-pieces are connected as a cathode. When a supply of alternating current voltage is used, the work-pieces may be connected in groups and be connected to the individual phases of the source of alternating current, thus, for instance, in three groups when the supply is effected by means of a three phase alternating current voltage; preferably, the individual work-pieces may in this case be so connected that adjacent pieces lie on different phases.

Of course, the starting process according to the invention is required not only in the carrying out of metallurgical processes, but indispensable in producing chemical reactions.

Figure 12:
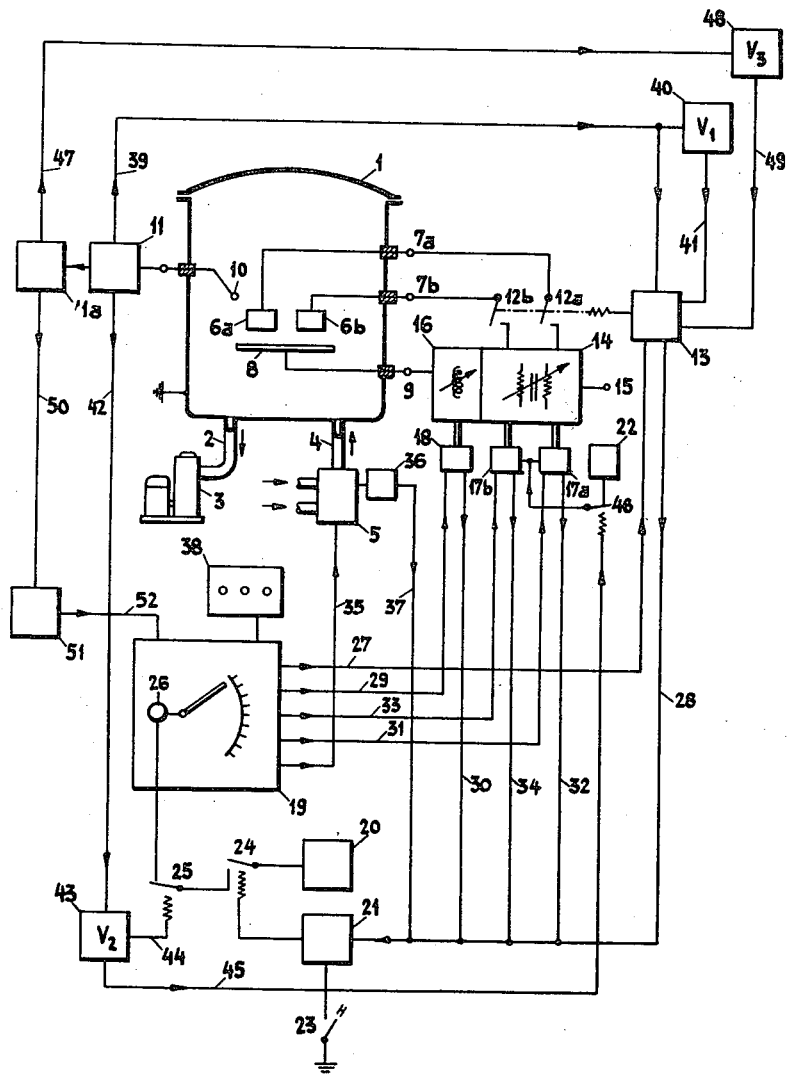
FIG. 12 is a basic diagram of a device for the automatic performance of the starting process.
Figure 13:
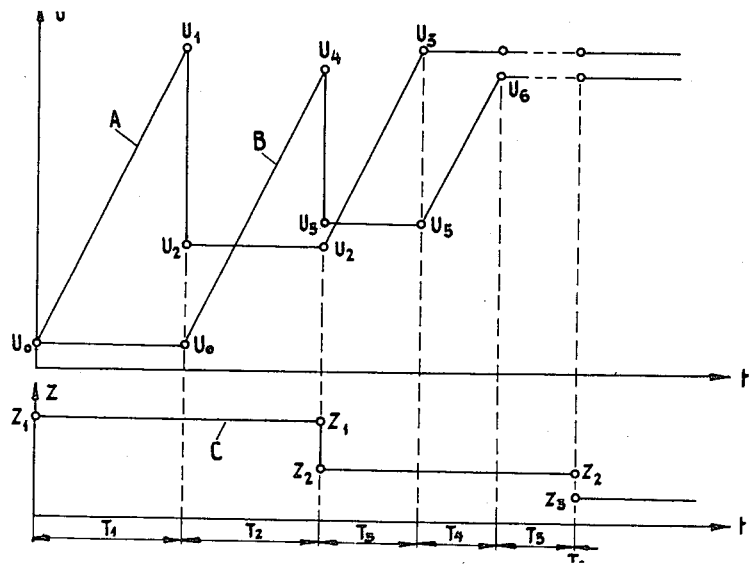
FIGS. 13 and 14 are diagrams of the operation of the device according to FIG. 12.
Figure 14:
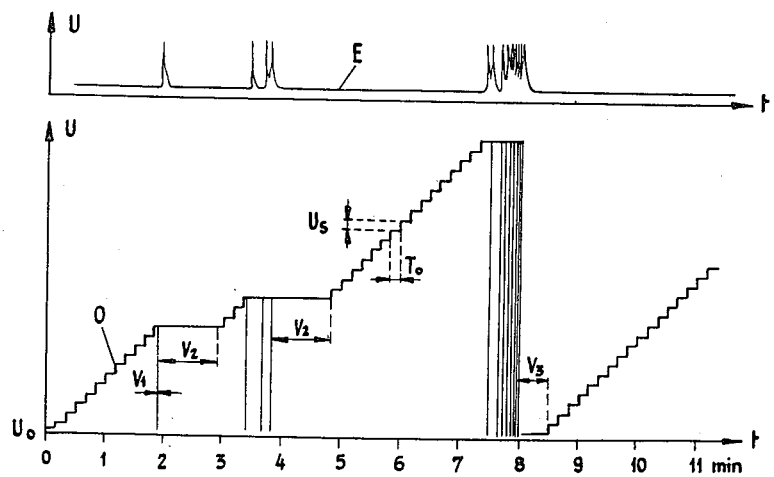

By way of example, an industrially tested device for the automatic performance of a starting process, the device diagrammatically disclosed in FIG. 12 will now be described in conjunction with the time diagrams according to FIGS. 13 and 14.

The apparatus according to the basic schematic FIG. 1 contains a discharge vessel 1 in which an underpressure can be produced by the exhaust pipe 2 and the pump 3. The gas atmosphere required for the various processes is produced by supplying the appropriate types and quantities of gas through pipe 4 from the regulating switch-valve 5. By way of example, the two work-pieces 6a and 6b are arranged in the discharge vessel 1 and connected by means of insulated lead-ins to terminals 7a and 7b respectively. There is a counterelectrode 8, likewise connected by means of an insulated current lead-in to terminal 9. Discharge vessel 1, mostly consisting of metal, is here by way of example not connected to any of the electrodes but earthed. Further, there is provided in discharge vessel 1 a sensitive element 10 of a supervising member 11, which serves to control the glow discharge condition at workpieces 6a and 6b.

The two terminals 7a and 7b are each supplied over a power switch 12a and 12b respectively, which are actuated jointly or singly by the switch operator device 13, from a source of current 14, which is in turn supplied with energy over the terminal 15 from a suitable mains, for instance a three-phase mains. In the given example, the source of energy can be regulated separately in regard to voltages supplied to terminals 7a and 7b. The common return circuit from terminal 9 of the discharge vessel 1 runs in this instance over stabilizing element 16, for instance a variable inductance of continuous or multistage pattern. Regulators 17a and 17b are provided to vary the voltages supplied to terminals 7a and 7b respectively. Likewise the stabilizing element 16 is varied by means of an appropriate adjusting device 18 working continuously or in stages.

With the parts of the apparatus so far described it would be possible to perform the initial part of the glow discharge process manually in the manner customary hitherto by, for example, actuating the switch-throwing gear 13 and closing switches 12a and 12b, and then, for example, first performing the initial process for workpiece 6a with regulator 17a, and subsequently the corresponding process for work-piece 6b with the regulator 17b, appropriate values being selected for the stabilizing element 16. It will be obvious that such a method of performing the initial processes makes heavy demands on the operating staff.

In contrast, the entire initial process can be performed according to the present invention perfectly automatically and in the shortest possible time. For purposes of explanation let it be assumed that the initial process comprises the six stages $T_1$ to $T_6$ (in actual practice it is normal for the number of stages in the programme to be much larger) shown in FIG. 2, where the traces A and B represent the voltages it is intended to apply to work-pieces 6a and 6b respectively:

Stage $T_1$=The inital voltage $U_0$ applied to work-piece 6a is increased to the final voltage $U_1$, the voltage on work-piece 6b remaining at value $U_0$. After attaining $U_1$ the voltage on work-piece 6a is reduced to value $U_2$, at which the glow discharge ceases; during this time the value of the stabilizing impedance is $Z_1$ as shown by the trace C.

Stage $T_2$=The workpiece 6a retains its voltage $U_2$ while the voltage on work-piece 6b is raised from an initial value $U_0$ to a final voltage $U_4$ and then reduced to a lower value $U_5$; the stabilizing impedance continues at the value $Z_1$.

Stage $T_3$=The stabilizing impedance has the lower value of $Z_2$ while the voltage on work-piece 6a is again increased from $U_2$ to the final value $U_3$ and remains at this level. During this time the voltage on work-piece 6b remains at the value $U_5$.

Stage $T_4$=The voltage on work-piece 6a retains the value $U_3$ and the stabilizing impedance the value $Z_2$ while the voltage on work-piece 6b is raised from $U_5$ to the value $U_6$.

Stage $T_5$=The stabilizing impedance maintains the value $Z_2$ and the work-pieces 6a and 6b continue to carry voltages $U_3$ and $U_6$ respectively. During this interval, however, the gas atmosphere is changed in regard to the dominating type of gas.

Stage $T_6$=After the gas atmosphere has been changed, the stabilizing impedance is reduced to the operating value $Z_3$, whereby the discharge condition is attained and the actual treating process commences.

Of course, the programme instanced here could only be performed in the chronological sequence represented in FIG. 2, provided there was no occurrence anywhere of irregularities in the discharge, to eliminate which the discharge condition prevailing at the time of the occurrence would have to be maintained unaltered for a longer period. A case of this kind will be described in greater detail below.

The apparatus for the automatic performance of a given programme is schematically represented in FIG. 1 and comprises the actual programme controller 19, a control receiver 21 and a timer 22 to actuate the regulator elements 12, 17a and 17b. The performance of the programme is, for instance, started by actuating switch 23 of the control receiver 21, thus temporarily closing a control contact 24 which connects the supply unit 20 over the closed resting contact 25 to the stopping mechanism 26 of the programme controller so that the latter is switched from its unoperated position to its first control position. All the subsequent performance of the given programme takes place automatically after this start—always provided that the supervising member 11 does not react—and will be described in brief below.

In the first control position, the switch-throwing gear 13 relating to switches 12a and 12b is excited over lead 27 by the programme controller 19 and these switches are closed. The completion of this operation is reported over circuit 28 to the control receiver 21 by means of a clear signal which causes the receiver to close control contact 24 temporarily so that the stopping mechanism 26 of the programme controller is moved forward to its next position by the supply unit 20. In this position the stabilizing impedance 16 is set at value $Z_1$ over the lead 26 and the regulator 17a is released to effect the increase in voltage on work-piece 6a according to stage $T_1$ of the programme in FIG. 2. Upon its release, the regulator 17a is actuated continuously or stepwise by the timer 22 in such a way that increase of voltage is effected in the temporal sequence predetermined according to trace A in FIG. 2. On the final position corresponding to voltage $U_1$ of the workpiece being attained, a clear signal is passed over lead 32 to control receiver 21 which, acting over control contact 24, causes the programme controller 19 to be stepped to the third control position, simultaneously procuring over lead 31 the return of regulator 17a, either continuously or stepwise, to a position corresponding to voltage $U_2$. This concludes stage $T_1$ of the programme.

In the third control position, the regulator element 17b is released by programme control device 19 over lead 33 so that, controlled by the timer 22, it can effect the increase of voltage on work-piece 6b required by stage $T_2$ from voltage $U_0$ to $U_4$ according to trace B in FIG. 2. On attaining a position corresponding to voltage $U_3$ the regulator 17b sends a clear signal over lead 34 to the control receiver 21 so that the latter can stop the programme controller 19 to the fourth position by acting through the control contact 24. Simultaneously the regulator 17b is returned continuously or stepwise to the position corresponding to voltage $U_5$. This concludes stage $T_2$ of the programme.

In the fourth position the adjusting device 18 relating to the stabilizing impedance 16 is operated over lead 29 and set at the lower value $Z_2$. Simultaneously the regulator 17a is released again so that the voltage of the work-piece 6a is raised by the amount required for stage $T_3$ from value $U_2$ to the final value $U_3$ according to the trace A in FIG. 2, the regulator 17a being appropriately controlled by the timer 22. On the position corresponding to the final value $U_3$ being attained, a signal is again passed from the regulator element 17a over the lead 32 to the control receiver 21, which acting through the control contact 24, steps the programme controller to the fifth position while the regulator 17a remains in the final position its has attained. This concludes stage $T_3$ of the programme.

In the fifth control position, the regulator 17b is again released by the programme controller 19 over lead 33 so that it may be actuated by timer 22 and raise the voltage of work-piece 6b from $U_5$ to $U_6$ the final value according to trace B in the stage $T_4$. The clear signal of the regulator 17b on reaching this final value $U_6$, acting through the control receiver 21, causes the programme controller to be stepped to the sixth position, while the regulator 17b also remains in the final position corresponding to the voltage $U_6$ on the completion of stage $T_4$ of the programme.

In stage $T_5$ of the programme, now commencing, the gas atmosphere in the discharge vessel is to be changed, entailing for example, the replacement of a reducing gas such as hydrogen appropriate to the initial process by the gas required for the actual treatment of the work-piece. To this end, the programme control device 19, in the sixth position, actuates the regulating change-over valve 5 so that another type of gas enters the discharge vessel 1 from the pipe 4. The exchange of gas is completed after a period of time corresponding to stage $T_5$ and a clockwork mechanism 36, adjusted to act after the elapse of this period, sends a clear signal over lead 37 to the control receiver 21 in order to step the programme controller 19 to the seventh position.

In the seventh position, the programme controller 19 actuates over lead 29 the adjusting device relating to the stabilizing impedance 16 and sets the latter at its operating value $Z_3$, whereupon a clear signal is passed over lead 30 to the control receiver 21. This steps the programme controller to the eighth position, thereby concluding stage $T_6$ of the programme.

When in the eighth control position, the programme controller 19 may be employed, for example, to switch the control leads 31 and 33 relating to regulators 17a and 17b respectively over to a push-key control panel 38, from which the voltage required for the treatment of the work-pieces can be adjusted manually, while the programme controller 19 and the control receiver 21 become inoperative. If desired, automatic gear for controlling the operation can, of course, be brought into action instead of the control panel 38 and will regulate the desired discharge conditions and keep them constant during the treatment period of the process which now begins and continues for many hours or even days.

It would be highly desirable if the programme could be performed as described under practical working conditions, but this is hardly practicable, for the work-pieces always have some imperfections on their outsides or the surface zone involved in the process. Consequently the supervising member 11 checking the uniformity of the glow discharge in the discharge vessel 1 frequently reacts and influences the performance of the programme as described below. The spontaneously and arbitrarily occurring changes in the glow discharge condition which influence the sensitive element 10 of the supervising member 11 usually begin immediately after the first strike of the glow discharge, i.e. already in stage $T_1$ of the programme. The number of these spontaneous events is always unknown—with work-pieces of substantial size, for example of 10,000 cm.$^2$ superficial area, it was ascertained on the completion of such a programme that the supervising member had reacted on several thousand separate occasions and influenced the performance of the programme. Moreover, the duration of each such spontaneous alteration in the discharge condition is quite uncertain. All that is known is that the minimum decay time is fixed by the necessary deionization at between 10 and 20 milliseconds. On the other hand such undesirable events with a decay time of up to one minute have been observed.

The control device according to the present invention is able to render such spontaneous changes in the discharge condition harmless. To this end, on the reaction of the supervising member 11, the switch-throwing gear relating to switches 12a and 12b is immediately brought into action with a minimum delay of at the most a few milliseconds over lead 39 and the supply of current to terminals 7a and 7b interrupted. Simultaneously the adjustable time-delaying member 40 is excited by the actuation of the switch-throwing gear 13 and causes the reclosing of switches 12a and 12b, quite independently of whether the supervising member 11 is still excited or not. It is preferable for the time-delaying member to be set at a time period such that the interruption of current supplied through switches 12a and 12b does not last longer than fom 20 to 100 milliseconds, that is to say that in the event of a non-recurrent disturbance in the discharge, the deionization of the disturbance centre has already taken place when the switches have been reclosed. If, on the reclosing of the switches, the supervising member 11 reacts again, the switching-off process described is repeated for the same interruption period $V_1$.

On the reaction of the supervising member 11, the time-delaying member 43 is excited over circuit 42, which in turn opens contact 25 over lead 44 and contact 46 over lead 45 for an adjustable time period $V_2$. This prevents the further stepping up of programme controller 19 as well as the actuation of regulators 17a and 17b by the timer 22 during the time interval $V_2$. In this way the performance of the control programme is stopped for the period $V_2$ and the latest stage of operations reached is maintained. A magnitude of 30 to 300 seconds has proved to be adequate for the time interval $V_2$. On the expiry of this period the programme is continued in the manner prescribed. It is more advantageous for the time-delaying member 43 to be so adjusted that in the event of the supervising member again reacting during the time interval $V_2$, the time-delaying member 43 is set back at its initial position, i.e. the contacts 25 and 46 are closed and the performance of the operation according to programme can continue only if the time interval $V_2$ has elapsed since the last reaction of the supervising member 11. Further, a counting device is combined with the supervising member 11 and ascertains the frequency with which the supervising member 11 reacts. On the registration of a predetermined and adjustable number of disturbances per unit of time, e.g. 10 per second, a time-delaying member 48 is actuated over wire-lead 47. The time-delaying member 48 actuates the switch-throwing gear 13 over lead 49 and opens switches 12a and 12b for the time interval $V_3$, for instance for 30 seconds, so that the glow discharge on work-pieces 6a and 6b ceases. If desired, a corresponding reduction of voltage to a lower value can be effected instead of an interruption. Simultaneously the resetting device 51 is actuated over lead 50 and in turn acts on the programme controller 19 and causes the latter to be reset at a stage of the programme that has already been performed. Experience shows that this arrangement makes it possible to render harmless violent changes in the discharge condition caused by serious gas outbursts on the surfaces of the work-piece and to prevent the occurrence of an undesirable flash-over.

The influence exercised on the programme by the supervising member 11 is reproduced in the diagram according to FIG. 3 where the trace D shows, for example, the increase of voltage on work-piece 6a in stage $T_1$ of the programme, i.e. according to trace A in the diagram of FIG. 2, on a greatly increased time scale. In this connection it is assumed that the timer 22 adjusts the regulator 17a by the partial voltage of $U_s$ at intervals of $T_0=10$ seconds. The trace E reproduces the reaction in pulses of the supervising member 11 on the same time scale, whereby it is assumed that each pulse of this trace effects an opening of the switch 12a for the time interval $V_1$ of 20 milliseconds.

After about ten regulation steps of the regulator 12a, the striking voltage of the glow discharge is attained, which causes the first reaction of the supervising member 11, thereby effecting the switching off of the current supplied to the work-piece 6a during the time interval $V_1$, and moreover prevents further actuation of the regulator 17a by the timer 22 during a time interval $Z_2=60$ seconds, so that during this time the voltage on work-piece 6a remains practically constant. On the expiry of the time interval $V_2$ the performance of the programme continues. If, as indicated in the diagram according to FIG. 3, on the next reaction of the supervising member 11 during the time interval $V_2$ further reaction impulses from the supervising member 11 reach the time-delaying member 43, the latter is always set back at its initial position. Only when, after the reaction of the supervising member 11, there has been no further spontaneous change in the discharge condition during the time interval $V_2$, can the performance of the programme continue in the predetermined manner. In this way it is ensured that the adjustment of the discharge process reached at any given time can only be relinquished when stabilization has been accomplished. All the same, it is observed in practice that the preliminary process remains in the same condition for a substantial length of time, because, for instance, impurities of any size must first be removed through the action of the glow discharge.

If, however, a condition is reached during the further performance of the programme in which a violent disturbance, such as a gas outburst on the surface, appears, which causes the supervising member 11 to react in quick succession, then, if the frequency of reaction is sufficiently great, the time-delaying member 48 is actuated and voltage is cut off from the work-piece 6a for the duration of the time interval $V_3$ of, for instance, 30 seconds. Simultaneously the regulator 17a is returned to its initial position, so that at the end of the time interval $V_3$ the programme is in the same place as at the beginning of that in the diagram in FIG. 3, i.e. at voltage $U_0$.

Of course, the programme controller 19 may be set back more than one stage of the programme. Further, the stabilizing impedance may, by way of example, be temporarily switched to its maximum value $Z_1$.

As may be seen, the supervising member 11 and the sensitive element 10 relating thereto are of decisive importance in the performance of the initial period of such glow discharge processes. In the arrangement indicated in FIG. 1 of the sensitive element 1 inside the discharge vessel 3, the element may take the form, for example, of an antenna or other suitable coupling member for the detection of electromagnetic waves which, as experience shows, appear on the surfaces of the work-pieces when there are spontaneous alterations in the discharge condition. In this case the supervising element 11 consists of an amplifier for these high-frequency oscillations connected up with suitable signalling equipment. There is also the possibility, however, of ascertaining the various spectral components of the glow, for example by means of suitable windows in the discharge vessel and converting spontaneously occurring alterations in the glow into suitable signals. Needless to say such undesirable spontaneous alterations in the discharge conditions also have their effect on the energy requirements at terminals $7a$ and $7b$ respectively or 9, and may be registered by means of sufficiently sensitive measuring apparatus at the supply leads and the power supply equipment respectively and converted into control signals.

In a tested device, the following values have, by way of example, been found to be suitable: $U_0=210$ v., $U_1=U_3=500$ v., $U_2=350$ v., $U_4=U_6=480$ v., $U_5=370$ v., $Z_1=50$ ohms, $Z_2=25$ ohms, $Z_3=5$ ohms, $U_5=4$ v., $T_0=0.7$ sec.

While the present process serves mainly to ensure a uniform treatment of the surfaces of the workpiece associated in the process, the complete discharge process is controlled within the discharge vessel. By way of example, the control described suppresses surface conduction at the insulated current lead-ins, which are particularly sensitive to same, since such occurrences are indicated by the control and cause a short interruption of current supply.

What we claim is:

1. In a starting process for stabilizing the operation of an electric glow discharge chamber for the production of an electrical gas and glow discharge of high current strength and high energy density at least at one surface of an object to be treated in a gaseous atmosphere for carrying out metallurgical, chemical, or other technical operations on such surface, said object being arranged as an electrode and insulated from a counter-electrode in the discharge chamber, said chamber having means for charging a gas thereinto and means for regulating the pressure of the gas in the chamber, said object being connected by way of an insulated current lead-in passing through the chamber wall with an at least periodically negative pole of a regulatable source of tension whose other pole is connected to the counter-electrode, the steps which comprise regulating the source of tension during a first time interval to a first voltage level and the gas pressure to a first pressure value, for such time until at the prevailing starting temperature at said object a gas or glow discharge of a lower intensity than corresponds to the operating condition is produced as much as possible at all the voltage-carrying constructional parts in the discharge chamber, said glow discharge effecting an at first incomplete elimination of disturbing areas on the surfaces of said voltage-carrying parts, and thereupon increasing the gas pressure and voltage to greater and greater values, so that with the thereby increased discharge energy an increasingly more complete elimination of said disturbing areas occurs, until finally at predetermined voltage and pressure values the surfaces of the voltage-carrying parts are entirely free of disturbing areas and are electrically homogenized, whereupon the starting interval is terminated and the operating interval for the carrying out of the treating process is begun.

2. Process according to claim 1, wherein the first-mentioned pole is connected in series with an impedance, and including the step of reducing said impedance during the starting interval from a higher value to a value which is smaller than the internal impedance prevailing at the terminals of the discharge chamber during the subsequent operating interval.

3. Process according to claim 1, wherein the starting process is carried out in a plurality of successive steps, and maintaining the individual steps for such a period of time until all defects in the surface layers are eliminated which at the energy and temperature existing at any time give rise to irregularities in the discharge at the voltage-carrying parts.

4. Process according to claim 1, wherein, in order to prevent a current rise in the gas or glow discharge above a predetermined maximum value, the voltage prevailing at the terminals of the discharge chamber is regulated practically without inertia, in that when the predetermined maximum current value is exceeded and the voltage falls below an adjustable minimum value, a lowering of the tension at the terminals for a short period of time is effected to a predetermined low value.

5. Process according to claim 1, wherein the first-mentioned pole is connected in series with an impedance, and including the step of reducing said impedance during the starting interval from a higher value to a value which is smaller than the internal impedance prevailing during the operating interval at the terminals of the discharge chamber, and amounts at most to about 30% of the said internal impedance.

6. Process according to claim 5, wherein the impedance connected to the first-mentioned pole is reduced to a value below 10% of the said internal impedance.

7. Process according to claim 1, wherein the starting process is carried out in a plurality of successive steps, and maintaining the individual steps for such a period of time until all defects in the surface layers are eliminated which at the energy and temperature existing at any time give rise to irregularities in the discharge at the voltage-carrying parts, and wherein at least one of said individual steps is carried out at such voltage and pressure values that a gas or a glow discharge occurs at the voltage-stressed surfaces of the current lead-ins.

8. Process according to claim 1, wherein the starting process is carried out in a plurality of successive steps, and maintaining the individual steps for such a period of time until all defects in the surface layers are eliminated which at the energy and temperature existing at any time give rise to irregularities in the discharge at the voltage-carrying parts, said individual steps being carried out in series, according to an adjustable rhythm and in a predetermined sequence according to a predetermined program, until no spontaneous changes in the discharge occur within the chamber, and upon occurrence of such spontaneous occurrences, regulating the programmed course of the individual steps pursuant to a supervisory element sensitive to such occurrences.

9. Process according to claim 8, wherein said regulating of the programmed course comprises stopping the normal program course, and resuming the same only after an adjustable delay interval.

10. Process according to claim 1, wherein the starting process is carried out in a plurality of successive steps, and maintaining the individual steps for such a period of time until all defects in the surface layers are eliminated which at the energy and temperature existing at any time give rise to irregularities in the discharge at the voltage-carrying parts, said individual steps being carried out in series according to an adjustable rhythm and in a predetermined sequence according to a predetermined program, until no spontaneous changes in the discharge occur within the chamber, and upon occurrence of such spontaneous occurrences, regulating the programmed course of the individual steps pursuant to a supervisory element sensitive to such occurrences by reducing the energy supply to the discharge chamber to a predetermined minimum value, and increasing the same to its previous value only after a selected time interval.

11. Process according to claim 10, including the steps of counting a plurality of immediately successive responses of the supervisory element and upon the reaching of a definite number, interrupting the normal program course, and returning the program to an already earlier traversed step and proceeding from such step onward after a selected time interval and pursuant to the program.

12. Apparatus for establishing stable operating conditions in a glow discharge chamber to be operated at high current strength and at high energy density at a selected area of the surface of an object to be treated in a gaseous atmosphere in said chamber for carrying out metallurgical, chemical or other technical operations on such area, said chamber having an electrode connected to said object and a counter-electrode insulated therefrom, means for charging a gas thereinto, an insulated current lead-in connected to said first electrode and passing through the chamber wall and a source of tension having an at least periodically negative pole connected to said lead-in, said apparatus comprising, in combination, means for regulating the source of tension to provide a first voltage level and a second, higher voltage level, means for regulating the gas pressure to a first pressure value and to a second, higher pressure, and mechanism for automatically establishing the higher voltage and pressure values after a predeterminal interval.

13. Apparatus according to claim 12, including an impedance connected in series with the first-mentioned pole, and means for reducing said impedance to a value which is smaller than the internal impedance at the terminals of the discharge chamber.

14. Apparatus according to clam 12, wherein the tension regulating means provides a plurality of voltage levels of progressively increasing magnitudes and the gas pressure regulating means provides a plurality of pressure levels of correspondingly and progressively increasing values, means for timing the intervals during which the successive voltage and pressure values prevail to provide a programmed course of glow discharge conditions in the chamber, and a supervisory element sensitive to spontaneous changes in the discharge and acting on the occurrence of such change to regulate the programmed course of the individual steps.

15. Apparatus according to claim 14, including means for counting a plurality of immediately successive responses of the supervisory element and means for interrupting the normal program course when the number counted reaches a predetermined value.

References Cited in the file of this patent

UNITED STATES PATENTS

| | | |
|---|---|---|
| 2,132,708 | Smith | Oct. 11, 1938 |
| 2,206,020 | Berghaus et al. | July 2, 1940 |
| 2,219,611 | Berghaus et al. | Oct. 29, 1940 |
| 2,219,613 | Berghaus et al. | Oct. 29, 1940 |
| 2,219,614 | Berghaus et al. | Oct. 29, 1940 |
| 2,219,615 | Berghaus et al. | Oct. 29, 1940 |
| 2,257,411 | Berghaus et al. | Sept. 30, 1941 |
| 2,358,620 | Berghaus et al. | Sept. 19, 1944 |
| 2,454,757 | Smith | Nov. 23, 1948 |
| 2,468,176 | Denton | Apr. 26, 1949 |
| 2,762,945 | Berghaus et al. | Sept. 11, 1956 |